June 16, 1936.  E. C. BULLARD  2,044,496

STATIONARY TOOL METALWORKING APPARATUS

Filed Aug. 11, 1931  2 Sheets-Sheet 1

INVENTOR.
EDWARD C. BULLARD
BY
ATTORNEY.

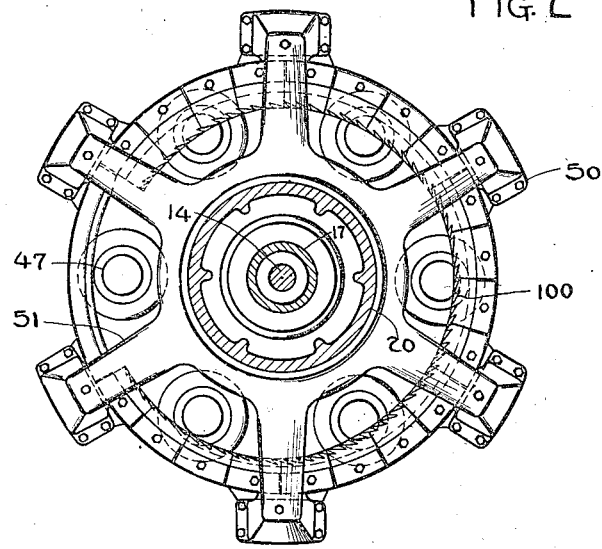
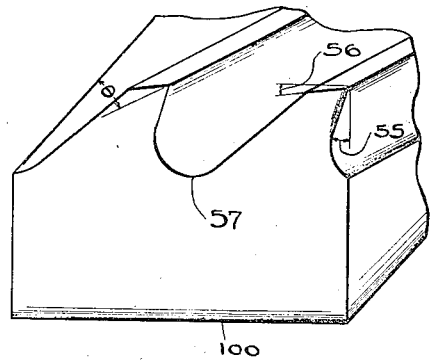
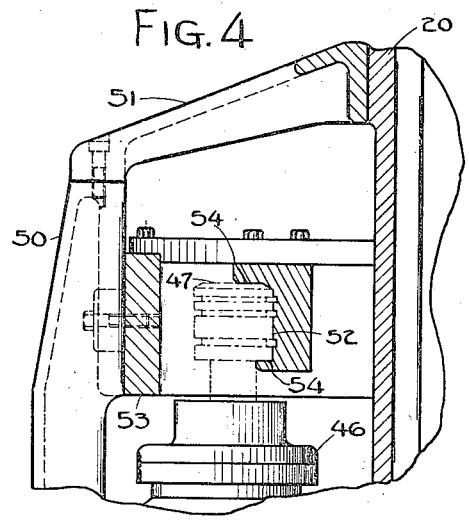

Patented June 16, 1936

2,044,496

UNITED STATES PATENT OFFICE 2,044,496

STATIONARY TOOL METAL WORKING APPARATUS

Edward C. Bullard, Southport, Conn., assignor to The Bullard Company, a corporation of Connecticut Application August 11, 1931, Serial No. 556,387

20 Claims. (Cl. 29—38)

This invention relates primarily to machine tools of the type in which the work piece is continuously moved through a predetermined cycle during which both the roughing and finishing operations thereon are consummated.

It is among the prime objects of the invention to provide a machine tool of the character described which is particularly efficient in operation, rapid in its production and simple in construction thereby to conform to all of the demands of economic manufacturing.

Another object is to provide a machine tool which will faithfully and accurately form or reduce the diameter of a given piece of work and in which the liability of chattering and frictional cutting losses will be reduced to a minimum.

A further object of the invention is to provide an apparatus of the character described in which moving tools and necessary complicated feed works therefor are done away with so as to provide a device in which simplicity of construction is combined with particular efficiency in operation. It will be understood that in connection with this feature of the invention, the necessary time losses for tooling the machine are almost wholly eliminated.

A further object of the invention is to provide a machine tool which will subject the work to the relayed action of a plurality of cutting tools and which will, therefore, partake of the many inherent advantages of such method of metal working.

Another object is to provide a machine tool which effectively utilizes substantially unvarying amounts of power so that sudden or unusual strains upon the cutters, the apparatus or its source of power are avoided. The continuous relayed action also permits the operation on a piece of work of various tools without requiring the work to be indexed from one work station to another. Thus, an object of the invention is to provide an apparatus which avoids the usual loss of time for the indexing operation.

Another object is to provide a machine tool which by the use of a single fixed tool will in a single cycle of operation act upon the work to effect both roughing and finishing operations thereon.

Another object of the invention includes the provision of a novel, simple, highly efficient instrumentality which embodies the foregoing desiderata.

While the inventive concept is broadly applicable to various choices of execution in the matter of design, one illustrative embodiment thereof consists of a vertical multiple spindle lathe in which a continuously rotating table is mounted and provided with a plurality of work spindles or chucks each of which is capable of rotation about its own axis. Either internally or externally adjacent the circular orbit of the work carried by the spindles or chucks a series of elongated angularly disposed blade edges are mounted, some of which may be stepped to provide for a progressive deepening cut in the work while others may be arranged parallel to the path of reduced circumference of the work so as to effect finishing cuts on the work. A feature of the invention is that each of the blades is preferably disposed at a major angle to a line extending transversely of the circular path of the work and also that each blade is preferably provided with a positive rake and clearance angle. The finishing blades are preferably spaced in accordance with a formula involving work feed per rotation and the number of such blades in order to insure the absence of revolution marks upon the finished surface.

In the drawings:

Fig. 2 is a horizontal section taken on the line 2—2 of Fig. 1.

Fig. 3 is a fragmentary end elevation in perspective showing on a large scale some of the cutter edges;

Fig. 4 is a fragmentary vertical section on a somewhat enlarged scale showing an arrangement of the inventive concept in which blade edges are arranged along the internal circumference of the work orbit.

Figure 1:
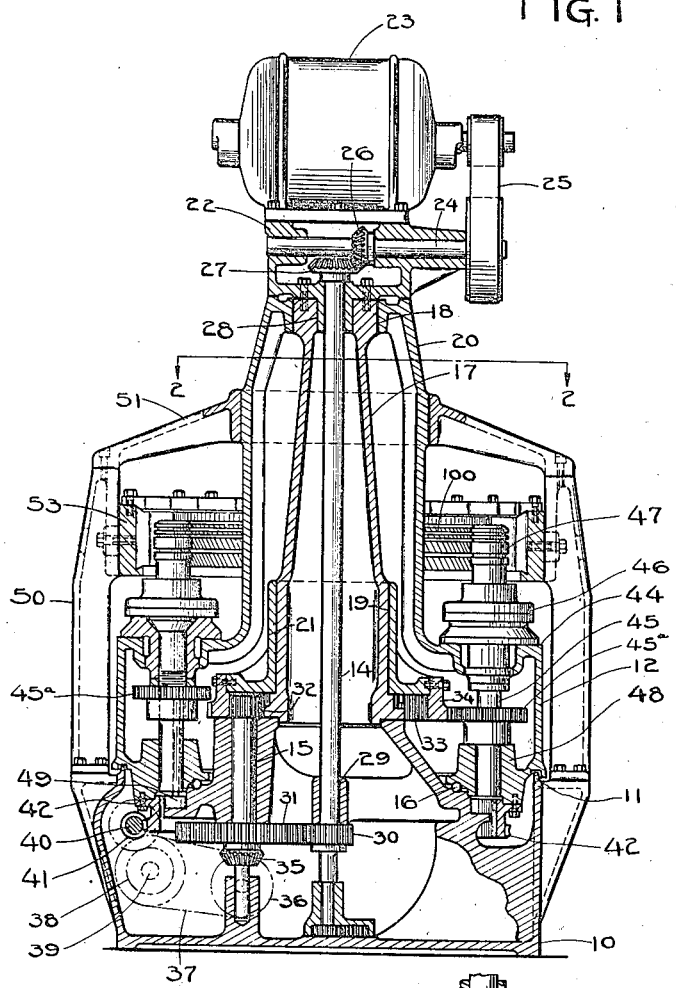
Fig. 1 is a vertical sectional view of one form of the present invention.
Figure 5:
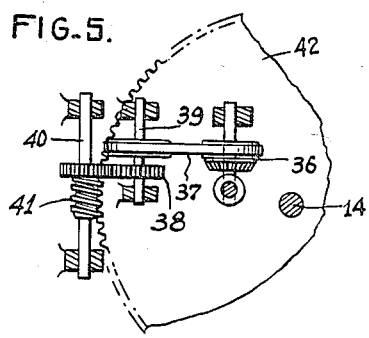
Figure 5 is a detail view in transverse section illustrating certain of the driving connections.
Figure 6:
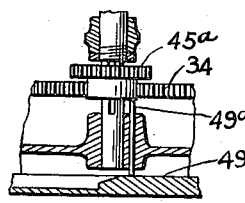
Figure 6 is a detail view illustrating a camming arrangement for disconnecting the spindles from their driving means.

Referring more particularly to Fig. 1 of the drawings, 10 represents the base of the machine, the edge 11 of the substantially cylindrical outer wall thereof receiving an annular groove of the carrier 12. The base includes suitable bearing means for the two driving shafts 14 and 15 as well as a support for the roller bearings 16 for the carrier. A central column 17 secured to the base 10 is provided with upper and lower bearing surfaces 18 and 19 respectively, upon which correspondingly shaped cylindrical portions 20 and 21 of the carrier are guided. Upon the upper end of the column 17 is secured a super frame structure 22 upon which the driving motor 23 is secured for operating the machine. An intermediate shaft 24 is journalled in the frame 22 which receives the drive from motor 23 as by the belt 25. Shaft 24 carries a beveled pinion 26 that drives an enmeshing beveled pinion 27 upon the main driving shaft 14 positioned centrally of the machine and extending vertically through the length of the machine, having an upper bearing 28 in the frame and a lower bearing 29 in the base.

The driving shaft 14 actuates both the table or carrier drive and the spindle drive by means of a gear 30 that meshes with and drives a gear 31 secured to the short vertical shaft 15 journalled in the base. Shaft 15 is provided with a pinion 32 for engaging the internal annular gear teeth 33 of the spindle drive gear 34 which is mounted on the cylinder 21, thus turning the spindle gears 45ª.

Upon the lower end portion of this shaft 15 is secured a beveled pinion 35 that meshes with and drives a similar beveled pinion mounted upon a shaft (not shown) carrying a wheel 36 which drives by means 37 a similar wheel 38 upon shaft 39 which in turn drives a worm shaft 40. A worm 41 on shaft 40 meshes with and operates the large annular worm-gear 42 attached to the base of the carrier for the purpose of continuously rotating the same. Any suitable means may be provided for engaging or disengaging the worm drive for the purpose of stopping or starting the carrier. The table or carrier is generally indicated by the numeral 12, its lower portion, as will be seen, is of a considerably larger diameter than the upper portion and at the point of the difference in the two diameters there is formed on the carrier a flange or table 44 upon which spindle bearings are mounted to accommodate the spindles 45, which in turn carry work fixtures 46 and work pieces 47. The work spindles 45 are supported in the flange 44 of the carrier and in lower bearings 48 formed in the lower portion of the carrier to which the large gear 42 is attached. The carrier is supported and operates on the bearings 16 and is further guided by the bearing of cylindrical portion 20 thereof upon the upper bearing surface 18 of the column.

Each of the spindles 45 is provided with a gear 45ª that meshes with and is driven by the spindle drive gear 34 as hereinbefore pointed out. In order that the work spindles 45 may be brought to a position of rest with respect to rotation on their own axes when they come to the loading station, automatic means are provided for disconnecting the drive to the spindles. Such means may consist of a fixed cam 49 on the framework of the base, which successively engages gear moving means 49ª for the gears 45ª, thus successively lifting the same out of engagement with the gear 34 as the spindle is passing the loading station.

The structure of the machine also includes a circular series of external braces or supports 50, the upper ends of which are united by a spider 51 which forms an external bearing for the upwardly extending columnar portion of the table. The tools or cutting blades 100 may be supported on a circular base 53 carried upon the braces 50 or if desired a circular series of externally facing blades 52 may be mounted internally of the work orbit as shown in Fig. 4. Obviously, the invention contemplates either one or the other or both arrangements for the blades. In addition thereto, it is obvious that the blade edges may in some instances extend across the orbital path in the horizontal plane indicated at 54 in Fig. 4. As therein to be noted blades may extend over and/or under the work whereby the upper or lower surface of the work may be turned together with a reduction or finishing of the side surface.

As more clearly indicated in Fig. 3, the blades are of the configuration shown in my co-pending application, Serial No. 556,386, filed August 11, 1931. Each elongated blade extends at an angle across the bounding surface of the orbital path of the work so as to provide a major angle of incidence with respect to the work, i. e., the blade edge is disposed at a minor angle to the direction of movement of the work surface as the blade is brought into engagement with the work. Each of the blades is provided with a rake angle 55 and a clearance angle 56 and intermediate the blades, the back slope of one blade merges into the rake surface of the next through an intermediate curved surface 57 to provide for chip curling and frictionless chip discharge. The relationship of the surfaces provides maximum efficiency through their cooperation in the avoidance of unnecessary friction, chip deformation and energy loss and by their provision of easy and efficient discharge of the chips removed.

In the operation of the machine the table is continuously rotated and as each spindle arrives at the loading station or open space at the ends of the circularly arranged blades, the cam operates to disengage the spindle so that the work thereon may be removed and a new piece of work chucked thereon. The carrier continues to move whereby the rotating work moves orbitally to pass across the face of the blades so that each blade successively operates on the surface of the work, the cutting action being relayed from one blade to the next and the cutting action for any blade will pass along the blade edge so that no one blade point will be subjected to continuous strain and heat due to continuous cutting action thereby. The circular series of blades may include a series of stepped blades, each of which has a blade edge positioned further toward the axis of the work than the next preceding blade so that each blade will act to perform an individual reducing cut on the work. The blade edges may, of course, depart from their rectilinear plane and may thus perform forming cuts whereby finished work will have a contour in conformance with the form of the blades.

An important feature of the invention is that some of the blades and in particular the blades of equal height which constitute the finishing blades, are arranged at a spacing conforming with the formula $$S = XF + \frac{F}{Y}$$

where S is the spacing of the blades, X is a constant to insure ample space for chip discharge, F is the feed per revolution of work and Y is the number of blades. By so spacing the blades revolutions marks, which are always produced as a consequence of a cutting action which passes axially over a rotating piece of work, are completely removed. This results from the fact that such spacing will cause each successive blade to engage the revolution mark produced by a preceeding blade.

From the foregoing it will be seen that the present invention provides a simple structure for the turning of work by the successive action of a plurality of blades whereby in a single cycle of operation and with only one chucking operation rough work may be cut to form and finished so as to rapidly produce large quantities of finished, form-cut work.

Numerous changes and modifications and the full use of equivalents may be utilized in carrying out the invention without departing from the spirit or scope of the appended claims.

Having thus set forth the nature of my invention, what I claim is:

1. In a machine tool a plurality of work spindles, a table for moving the spindles in an orbital path, means for rotating the table, means for rotating the spindles on their own axes to carry the work at a peripheral speed greater than the orbital movement of said spindles, and a plurality of radially stepped cutting blades arranged in the path of the work carried by the spindles.

2. In a machine tool including means for moving rotary work pieces in a circular path, means for rotating the work pieces at a cutting speed, and a plurality of radially stepped cutting blades extending substantially an equal distance into the path of the work to perform a turning operation thereon and spaced apart a distance determined by the rate at which the blades are to cut and the number of such blades.

3. A machine tool including in combination, means for rotating work pieces at a cutting speed, means for moving said pieces, while rotating, in an orbital path, a plurality of elongated cutting blades arranged at an acute angle across the path of the work pieces, and including a series of blades the edges of which extend into the path in stepped relation, and a series the edges of which are arranged at an equal radius.

4. A machine tool including in combination, means for rotating work pieces at a cutting speed, means for moving said pieces while rotating in an orbital path, a plurality of elongated cutting blades arranged at an acute angle across the path of the work pieces, and including a series of blades the edges of which extend into the path of the rotating work in stepped relation, and a series the edges of which are arranged at an equal radius, the latter series being spaced apart a distance based on feed per revolution of work and the number of such blades.

5. In a machine of the class described, a base, a horizontal rotatable table supported by the base, a plurality of spindles carried by the table and adapted for rotation upon their own axes, a driving means, a central driving shaft operated by the driving means, means operable from said shaft to continuously operate the table, means operable from said shaft to rotate the spindles, means for disconnecting the spindles from their driving means at a certain portion of their cycle of revolution with the table, and a plurality of series of cutting blades arranged to engage work carried by the spindles at a minor angle to the direction of movement of the spindles, one of said series providing a spiral arrangement of blade edges, while a different series provides blade edges extending in an equal distance toward the axis of rotation of the work, the blade edges of said different series being spaced apart a distance determined by the relation of work movement to work rotation in conjunction with the number of blades in the series.

6. In a machine tool, the combination of a circular series of individually rotatable work carrying spindles, means for rotating said spindles to carry the work surface at a cutting speed, a cooperating circular series of elongated angularly disposed cutting blades, and means for continuously passing work rotated by the spindles tangentially of the cutting blades to permit a successive turning action by said blades.

7. In a machine tool, a rotary work holder, means for bodily moving the work holder, means for rotating said work holder at a considerably greater peripheral speed than the bodily movement thereof, and a series of elongated tool blades mounted adjacent the path of the work holder whereby work carried by the work holder will be engaged by the tool to perform a turning operation thereon.

8. In a machine tool, a work holder, means for bodily moving the work holder, and a tool having an elongated blade mounted adjacent the path of the work holder, means for rotating the work holder to carry the work surface at a cutting speed, whereby work carried by the work holder will be engaged by the tool to perform a turning operation thereon.

9. In a machine tool, a work holder, means for bodily moving the work holder, means for rotating the work holder to carry the work surface at a cutting speed, and a tool having an elongated blade disposed at a minor angle with respect to the direction of movement of the work holder, and mounted adjacent the path of the work holder whereby work carried by the work holder will be engaged by the tool to perform a turning operation thereon.

10. In a machine tool a work holder, means for bodily moving the work holder, means for rotating the work holder to carry the work surface at a cutting speed, and a fixed tool including a plurality of elongated blades mounted adjacent the path of the work holder whereby work carried by the work holder will be engaged successively by the blades of the tool to perform a turning operation on the work.

11. In a machine tool a work holder, means for bodily moving the work holder, means for rotating the work holder to carry the work surface at a considerably greater speed than the bodily movement of the work holder, and a tool including a plurality of elongated angularly disposed blades mounted adjacent the path of the work holder whereby work carried by the work holder will be engaged successively by the blades of the tool to perform a turning operation on the work.

12. In a machine tool including a plurality of work holders, means for bodily moving the work holders, means for rotating the work holders to carry the work surface at a considerably greater speed than the bodily movement of the work holders, and a tool having a plurality of elongated angularly disposed blades mounted adjacent the path of the work holders whereby work carried by the work holders will be successively engaged by the successive blades of the tool to perform a turning operation on the work.

13. In a machine tool, the combination of a circular group of rotary work holders, means for moving the work holders together in a group, means for rotating the work holders to carry the work surface at a cutting speed, and a circular series of fixed tool blades adapted to successively engage the work to turn the same as it is moved.

14. In a machine of the class described a circular series of cutting blades, means for continuously passing work in an orbital path relative to the blades, and means for rotating the work at a cutting speed, whereby the blades will successively perform a turning operation upon the work.

15. In a machine of the class described a base, a horizontal rotatable table supported by the base, means for rotating said table, a plurality of spindles carried by the table and adapted for rotation upon their own axes, means for rotating said spindle to carry the surface of work thereon at a cutting speed, and a plurality of series of cutting blades arranged to engage work carried by the spindles at a minor angle to the direction of movement of the work surface, one of said series providing a spiral arrangement of blade edges, while a different series provides blade edges extending in an equal distance toward the axis of the work, the blade edges of said different series being spaced apart a distance determined by the relation of work movement to work rotation in conjunction with the number of blades in the series.

16. In a machine of the class described a rotatable table, a plurality of spindles carried by said table, a main drive shaft, connections from said shaft for rotating said table at a slow speed, connections from said shaft for rotating said spindles at a relatively high speed, and a plurality of cutting edges angularly disposed across the path of the surface of work carried by said spindles and adapted to successively perform turning operations upon the work.

17. In a machine of the class described a plurality of rotatable work spindles, means for rotating said spindles to carry the surfaces of work thereon at a cutting speed, a cutter base having a plurality of cutting edges, and means for producing relative bodily movement between said spindles and base to provide a successive turning action of said edges on work carried by said spindles.

18. In a machine of the class described a plurality of rotatable work spindles, means for rotating said spindles to carry the surfaces of work thereon at a cutting speed, a cutter base having a plurality of cutting edges, means for producing relative bodily movement between said spindles and base to provide a successive turning action of said edges on work carried by said spindles, and means for disconnecting said spindles from said rotating means at a predetermined point in the relative movement between said spindles and base.

19. In a metal working tool, means for simultaneously turning a plurality of spaced surfaces on a work piece including a tool block, a plurality of spaced series of angularly disposed cutter blades formed on said block, whereby the cutting action will move across each blade edge, means for rotating the work and means for causing a respective movement between the work and the block whereby the blades of the cutters will successively operate on the surfaces to be turned.

20. In a machine tool, the combinaion of means for holding and rotating a work piece having a plurality of surfaces to be turned, a tool block having a plurality of a series of angularly disposed cutting blades, whereby the cutting action will move across each blade edge, means for effecting respective movement between the work piece and the tool block, while the work piece is rotating, so as to subject the work piece, while rotating, to a simultaneous action by said series so that each series will cause its work surfaces to be successively acted upon by the blades thereof.

EDWARD C. BULLARD.